US012510518B2

(12) United States Patent
Stoll et al.

(10) Patent No.: US 12,510,518 B2
(45) Date of Patent: Dec. 30, 2025

(54) BRACKETING FLUIDIC SAMPLE USING STRONG SOLVENT (71) Applicant: Agilent Technologies, Inc., Santa Clara, CA (US)

(72) Inventors: Dwight Robert Stoll, Saint Peter, MN (US); Stephan Buckenmaier, Ettlingen (DE); Sascha Lege, Baden-Wuerttemberg (DE); Thomas Ortmann, Ottenhausen (DE); Konstantin Shoykhet, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 206 days.

(21) Appl. No.: 17/913,313

(22) PCT Filed: Mar. 15, 2021

(86) PCT No.: PCT/IB2021/052137
§ 371 (c)(1),
(2) Date: Sep. 21, 2022

(87) PCT Pub. No.: WO2021/191725
PCT Pub. Date: Sep. 30, 2021

(65) Prior Publication Data
US 2023/0112993 A1    Apr. 13, 2023

(30) Foreign Application Priority Data

Mar. 24, 2020  (GB) ..................................... 2004237

(51) Int. Cl.
*G01N 30/34* (2006.01)
*B01D 15/14* (2006.01)
(Continued)

(52) U.S. Cl.
CPC ............. *G01N 30/34* (2013.01); *B01D 15/14* (2013.01); *B01D 15/166* (2013.01); *G01N 30/20* (2013.01); *G01N 30/463* (2013.01)

(58) Field of Classification Search
CPC ................................. G01N 30/24; B01D 15/08
See application file for complete search history.

(56) References Cited

U.S. PATENT DOCUMENTS 7,875,175 B2 *  1/2011  Wheat ................... B01D 15/22
                                                                    210/659
7,909,994 B2 *  3/2011  Wheat ................... G01N 30/34
                                                                    210/659

(Continued)

FOREIGN PATENT DOCUMENTS

CN    107449851 A    12/2017
CN    109313168 A    2/2019
(Continued)

OTHER PUBLICATIONS

English Translation of WO-2019087027 (Year: 2019).*
(Continued)

*Primary Examiner* — Tran M. Tran (57) ABSTRACT

A sample separation device for separating a fluidic sample includes a fluid drive for driving a mobile phase and the fluidic sample when injected in the mobile phase, a sample separation unit for separating the fluidic sample in the mobile phase, and a control unit configured for bracketing the fluidic sample between two mobile phase portions of the mobile phase. At least one of the mobile phase portions is arranged directly next to the fluidic sample and has a higher solvent strength compared to a solvent of the fluidic sample.

18 Claims, 5 Drawing Sheets

(51) Int. Cl.
  *B01D 15/16* (2006.01)
  *G01D 15/14* (2006.01)
  *G01D 15/16* (2006.01)
  *G01N 30/20* (2006.01)
  *G01N 30/46* (2006.01)

(56) References Cited

U.S. PATENT DOCUMENTS

| | | | | |
|---|---|---|---|---|
| 8,622,609 | B2* | 1/2014 | Shreve | G01N 30/34 366/349 |
| 8,894,274 | B2* | 11/2014 | Shreve | B01D 15/14 366/349 |
| 9,126,164 | B2* | 9/2015 | Shreve | B01F 35/883 |
| 9,782,692 | B2* | 10/2017 | Witt | G01N 30/34 |
| 9,791,107 | B2* | 10/2017 | Witt | F17D 3/01 |
| 9,816,971 | B2* | 11/2017 | Jackson | G01N 30/06 |
| 9,945,762 | B2* | 4/2018 | Wikfors | G01N 30/20 |
| 10,132,306 | B2* | 11/2018 | Jackson | F04B 49/20 |
| 10,209,229 | B2* | 2/2019 | Albrecht, Jr. | G01N 30/38 |
| 10,478,749 | B2* | 11/2019 | Wikfors | G01N 30/32 |
| 10,641,746 | B2* | 5/2020 | Thielsch | G01N 30/22 |
| 10,670,568 | B2* | 6/2020 | Jackson | G01N 30/20 |
| 11,105,778 | B2* | 8/2021 | Gilar | G01N 30/34 |
| 11,143,633 | B2* | 10/2021 | Tarafder | G01N 30/22 |
| 11,262,334 | B2* | 3/2022 | Song | B01D 35/1435 |
| 11,898,998 | B2* | 2/2024 | Jackson | G01N 30/20 |
| 11,913,918 | B2* | 2/2024 | Williams | G01N 30/6017 |
| 12,025,593 | B2* | 7/2024 | Hill | G01N 30/56 |
| 12,078,619 | B2* | 9/2024 | Ortmann | G01N 30/22 |
| 12,313,607 | B2* | 5/2025 | Ortmann | G01N 30/14 |
| 2006/0273012 | A1* | 12/2006 | Dehmer | G01N 30/6052 210/639 |
| 2013/0134079 | A1 | 5/2013 | Jarrell et al. | |
| 2013/0134095 | A1* | 5/2013 | Anderer | G01N 30/463 210/656 |
| 2015/0059451 | A1 | 3/2015 | Witt et al. | |
| 2017/0343518 | A1 | 11/2017 | Thielsch et al. | |
| 2019/0170706 | A1* | 6/2019 | Gilar | G01N 30/24 |

FOREIGN PATENT DOCUMENTS

| | | |
|---|---|---|
| DE | 102015101772 A1 | 8/2016 |
| EP | 1577012 A1 | 9/2005 |
| GB | 201915716 | 12/2019 |
| WO | 2008036586 A2 | 3/2008 |
| WO | 2017192792 A1 | 11/2017 |
| WO | WO-2019087027 A1 * | 5/2019 ............ G01N 30/08 |
| WO | 2019193401 A1 | 10/2019 |

OTHER PUBLICATIONS

Dolan, John W. et al., "The Power of Mobile Phase Strength," LCGC North America, vol. 24, No. 6, Jun. 2006, 570-578.

Gargano, Andrea F G. et al.,"Reducing Dilution and Analysis Time in Online Comprehensive Two-Dimensional Liquid Chromatography by Active Modulation," Analytical Chemistry, vol. 88, No. 3, Dec. 28, 2015, pp. 1785-1793.

Jandera, Pavel et al., "Effect Of The Sample Solvent On Band Profiles In Preparative Liquid Chromatography Using Non-Aqueous Reversed-Phase High-Performance Liquid Chromatography," Journal of Chromatography, vol. 588,1991,pp. 1-14.

Larson, Elliot D. et al., "Development of Selective Comprehensive Two-dimensional Liquid Chromatography with Parallel First-dimension Sampling and Second-dimension Separation-application to the Quantitative Analysis of Furanocoumarins in Apiaceous Vegetables," Analytical and Bioanalytical Chemistry, vol. 405, No. 13, Feb. 16, 2013, pp. 4639-4653.

Mishra, Manoranjan et al., "Influence Of A Strong Sample Solvent On Analyte Dispersion In Chromatographic Columns," Journal of Chromatography A, vol. 1297, 2013, pp. 46-55.

Rasmussen, H T. et al., "Effects of Sample Solvent Strength and Injection Volume on Band Broadening and Throughput in Reversed Phase Prep Scale H PLC," Journal of Liquid Chromatography, vol. 13, No. 15, Sep. 1, 1990, pp. 3079-3089.

Snyder, Lloyd R. et al., "3.6 Autosamplers," Introduction to Modern Chromatography, Jan. 1, 2010, 13 Pages.

WIPO, et al., "Notification of Transmittal of The International Search Report And The Written Opinion of The International Searching Authority" dated Jun. 8, 2021 for Application No. PCT/IB2021/052137, 17 Pages.

Chinese office action and search report dated Mar. 6, 2025 for CN application No. 202180023941.5; 18 pages.

Cui, Lianxi, et al., "Effects of Sample Solvents on High-Performance Liquid Chromatography Analysis Results;" Guangzhou Chemical Industry, vol. 18; Sep. 23, 2016.

Chinese office action and search report dated Sep. 18, 2025 for CN application No. 202180023941.5; 6 pages.

* cited by examiner

BRACKETING FLUIDIC SAMPLE USING STRONG SOLVENT

RELATED APPLICATIONS

This application is the national stage under 35 U.S.C. 371 of International Application No. PCT/IB2021/052137, filed Mar. 15, 2021; which claims priority to UK Application No. GB 2004237.0, filed Mar. 24, 2020; the entire contents of each of which are incorporated by reference herein.

TECHNICAL FIELD

The present invention relates to a sample separation device, a method of separating a fluidic sample, and a fluid stream.

BACKGROUND

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. Thereafter, an injector valve is switched so as to introduce the intaken amount of fluidic sample from the sample loop of a metering path into the separation path between fluid drive unit and the separation unit for subsequent separation. As a result, the fluidic sample is injected into the mobile phase, such as a solvent or a solvent composition. It is important for a precise separation of the fluidic sample that the composition of the mobile phase is accurate.

However, guiding a fluidic sample through conduits without artifacts on the sample separation device and the separation accuracy may be difficult.

SUMMARY

It is an object of the invention to enable a proper guiding of a fluidic sample through conduits without artifacts on a sample separation device and/or the separation accuracy.

According to an exemplary embodiment of the present invention, a sample separation device for separating a fluidic sample is provided, wherein the sample separation device comprises a fluid drive for driving a mobile phase and the fluidic sample when injected in the mobile phase, a sample separation unit for separating the fluidic sample in the mobile phase, and a control unit configured for bracketing the fluidic sample between two mobile phase portions of the mobile phase, wherein at least one of the mobile phase portions is arranged directly next to the fluidic sample and has a higher solvent strength compared to a solvent of the fluidic sample.

According to another exemplary embodiment, a method of separating a fluidic sample is provided, wherein the method comprises driving a mobile phase and the fluidic sample, injecting the fluidic sample in the mobile phase, separating the fluidic sample in the mobile phase by a sample separation unit, and bracketing the fluidic sample between two mobile phase portions of the mobile phase, wherein at least one of the mobile phase portions is arranged directly next to the fluidic sample and has a higher solvent strength compared to a solvent of the fluidic sample.

According to still another exemplary embodiment, a fluid stream is provided which comprises a chromatographic sample directly between two mobile phase portions of higher solvent strength compared to a solvent of the chromatographic sample.

In the context of this application, the term "sample separation device" may particularly denote any apparatus which is capable of separating different fractions of a fluidic sample by applying a certain separation technique, in particular liquid chromatography.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance small mass molecules or large mass biomolecules such as proteins. Separation of a fluidic sample into fractions may involve a certain separation criterion (such as mass, volume, chemical properties, etc.) according to which a separation is carried out.

In the context of this application, the term "mobile phase" may particularly denote any liquid and/or gaseous medium which may serve as fluidic carrier of the fluidic sample during separation. A mobile phase may be a solvent or a solvent composition (for instance composed of water and an organic solvent such as ethanol or acetonitrile). In an isocratic separation mode of a liquid chromatography apparatus, the mobile phase may have a constant composition over time. In a gradient mode, however, the composition of the mobile phase may be changed over time, in particular to desorb fractions of the fluidic sample which have previously been adsorbed to a stationary phase of a separation unit.

In the context of the present application, the term "fluid drive" may particularly denote an entity capable of driving a fluid (i.e. a liquid and/or a gas, optionally comprising solid particles), in particular the fluidic sample and/or the mobile phase. For instance, the fluid drive may be a pump (for instance embodied as piston pump or peristaltic pump) or another source of high pressure. For instance, the fluid drive may be a high-pressure pump, for example capable of driving a fluid with a pressure of at least 100 bar, in particular at least 500 bar.

The term "separation unit" may particularly denote a fluidic member through which a fluidic sample is transferred and which is configured so that, upon conducting the fluidic sample through the separation unit, the fluidic sample will be separated into different groups of molecules or particles. An example for a separation unit is a liquid chromatography column which is capable of trapping or retarding and selectively releasing different fractions of the fluidic sample.

In the context of the present application, the term "mobile phase portion arranged directly next to the fluidic sample" may particularly denote that the mobile phase portion and the fluidic sample flowing in a fluidic conduit are provided directly subsequently without another medium (such as a gas or another liquid) in between. In particular, the mobile phase portion and the fluidic sample may be in direct physical contact with each other, i.e. may adjoin to each other. For instance, the mobile phase portion and the fluidic sample may form a continuous uninterrupted liquid stream.

In the context of the present application, the term "solvent strength" may particularly denote a capability of a fluid to elute or desorb a fluidic sample adsorbed on a stationary phase of a sample separation unit (such as a chromatographic column). In other words, a fluid with a higher solvent strength may have a stronger elution force for a fluidic sample immobilized at a sample separation unit than a fluid with a lower solvent strength. Thus, the terms "weak" and "strong" solvent may relate to an elution force of the respective solvent in terms of releasing a fluidic sample from a sample separation unit. Descriptively speaking, a solvent with a high solvent strength may prevent, inhibit or reduce adsorption of the fluidic sample at the stationary phase and may increase solubility of this fluidic sample in the solvent with the higher solvent strength. For instance, an increase of the solvent strength may be accomplished by the addition of a salt or the increase of a salt concentration of a solvent. However, also the base material of the solvent may have an impact on the solvent strength. For instance, water has a lower solvent strength than organic solvents such as ethanol, methanol or acetonitrile (ACN).

According to an exemplary embodiment of the invention, a plug of a fluidic sample, which is to be separated into fractions, may be arranged directly adjacent to a mobile phase portion with a higher solvent strength in comparison with a solvent of the fluidic sample itself. This has the advantage that the fluidic sample may then be forced to flow through a fluidic conduit towards a sample separation unit for sample separation without the risk that fluidic sample material sticks or adsorbs to conduit walls, etc. If this happens, the solvent with the high solvent strength may promote erroneously adsorbed fluidic sample to be released again from the conduit walls, etc. Thus, the mobile phase portion with higher solvent strength may keep the fluidic sample together and may also prevent highly undesired carryover of fluidic sample from one separation run to another separation run. This advantageous effect is promoted in particular by a direct fluidic connection between the fluidic sample and the mobile phase portion with higher solvent strength, since this promotes a proper interaction between fluidic sample and the high solvent strength mobile phase. Thus, the direct sequence of the sample plug and the mobile phase plug with higher solvent strength may enable sample separation without the risk of contamination or the loss of sample. Furthermore, the directly adjacent sequence of fluidic sample and mobile phase portion with higher solvent strength may efficiently suppress a risk of undesired precipitation of fluidic sample. Advantageously, undesired sample loss, carryover and precipitation may thus be efficiently prevented in particular at critical portions of a sample separation device (for instance switching positions at fluidic valves) by adding a mobile phase portion with higher solvent strength directly adjacent to the fluidic sample. Although the mobile phase portion with higher solvent strength may involve a slight self-desorption of the fluidic sample at the sample separation unit, it has turned out that this phenomenon can be accepted in certain scenarios or can even be suppressed with simple measures (as described below).

In the following, further embodiments of the sample separation device, the method of separating a fluidic sample, and the fluid stream will be explained.

In an embodiment, the control unit is configured for bracketing the fluidic sample directly between two mobile phase portions of higher solvent strength. When both a leading edge and a trailing edge of the fluidic sample plug is located directly adjacent to a respective mobile phase portion of higher solvent strength, undesired sample loss, carryover and precipitation may be prevented particularly efficiently.

In an embodiment, the control unit is configured for supplying a further mobile phase portion of lower solvent strength following, in particular directly following, the mobile phase portion of the higher solvent strength following the fluidic sample. In particular, the further mobile phase portion may have a lower solvent strength than the mobile phase portion(s) of the higher solvent strength, and in particular also than the solvent of the fluidic sample. Such a subsequent mobile phase portion with lower solvent strength may improve the focusing of the fluidic sample on the sample separation unit, since such low solvent strength mobile phase enhances sample adsorption on the stationary phase.

In an embodiment, the control unit is configured for reducing a solvent strength profile between the solvent of the fluidic sample and the at least one of the mobile phase portions with the higher solvent strength before the fluidic sample reaches the sample separation unit. The term "strength profile" may denote a difference between a solvent strength of the fluidic sample and one or both mobile phase portions with higher solvent strength directly before and/or directly behind the fluidic sample. Highly advantageously, the solvent strength of the mobile phase portion(s) directly adjacent to the plug of fluidic sample may be high while the fluidic sample flows towards the sample separation unit, and may be reduced in the last section of a flow path before the fluidic sample reaches the sample separation unit. This ensures that the fluidic sample is properly focused on the stationary phase, while simultaneously making sure that sample loss, sample precipitation and carryover remain strongly suppressed. For instance, the control unit may be configured for selectively modifying a dilution factor of the fluidic sample over time, in particular for the purpose of reducing a solvent strength profile directly prior to a chromatographic column. By taking this measure, the solvent strength profile may be properly adjusted, in particular smoothed, before the fluidic sample reaches the sample separation unit. In particular, profile smoothing may be accomplished by dilution with a further mobile phase having a lower solvent strength than the at least one of the mobile phase portions with the higher solvent strength.

In an embodiment, the control unit is configured for arranging a further mobile phase portion with a lower solvent strength compared to a solvent of the fluidic sample directly next to the fluidic sample before the fluidic sample reaches the sample separation unit. This can be accomplished in such a way that the fluidic sample is no longer directly next to the at least one of the mobile phase portion(s) with the higher solvent strength when the fluidic sample reaches the sample separation unit.

In an embodiment, the sample separation device comprises an injector for injecting the fluidic sample into a flow path towards the sample separation unit by combining the fluidic sample with only one or both of the mobile phase portions at a fluidic coupling point or fluidic junction. In particular, such a combination of fluidic sample and mobile phase may be accomplished in terms of feed injection. Combining fluids at a fluidic coupling point (such as a fluidic T-point) is a highly appropriate mechanism of forming the sequence of fluidic sample plug directly connected to one or two mobile phase portions with higher solvent strength.

In an embodiment, the sample separation device comprises an injector for injecting the fluidic sample into a flow path towards the sample separation unit, wherein the injector comprises a sample accommodation volume for accommodating the fluidic sample prior to injecting, a sample drive configured for intaking the fluidic sample into the sample accommodation volume, a fluidic valve switchable between multiple switching states to thereby selectively couple the sample accommodation volume with the flow path or decouple the sample accommodation volume from the flow path, wherein in an injection switching state of the fluidic valve, the fluid drive, the separation unit and the sample drive are fluidically coupled by the fluidic valve so that fluid driven by the sample drive and flowing from the sample accommodation volume to the separation unit and further fluid driven by the fluid drive and flowing from the fluid drive to the separation unit are combined at a fluidic connection upstream of the separation unit. Such an embodiment is illustrated for instance in FIG. 4 to FIG. 7. As already mentioned, such a feed injection architecture may be advantageously carried out in combination with the fluidic sample being directly connected to a mobile phase portion of higher solvent strength.

In an embodiment, the sample separation device comprises a further fluid drive for driving further mobile phase and the fluidic sample separated by the sample separation unit, and a further sample separation unit for further separating the fluidic sample after separation by the sample separation unit. In particular, the sample separation device may comprise a fluidic switch (such as a fluidic valve) coupled to an outlet of the sample separation unit and to the further fluid drive and configured for being switchable for transferring the fluidic sample separated by the sample separation unit to the further sample separation unit. Such a two-dimensional sample separation device is illustrated for instance in FIG. 8 and FIG. 9. The advantages of a fluidic sample directly connected to a mobile phase portion of higher solvent strength are particularly pronounced in a two-dimensional sample separation device, since issues of sample loss, sample precipitation and carryover are particularly challenging in two-dimensional chromatography with long flow paths.

In an embodiment, the sample separation device comprises a buffer volume for temporarily buffering a portion of the fluidic sample separated by the sample separation unit and for subsequently forwarding the temporarily buffered portion of the fluidic sample for further separation by the further sample separation unit. A fluidic sample directly connected to a mobile phase portion of higher solvent strength may render it possible that the order of buffering and forwarding sample portions can be freely selected rather than being limited to a "first in, first out" concept.

In an embodiment, the control unit is configured for forwarding the temporarily buffered portions of the fluidic sample for further separation in a freely selectively order. Additionally or alternatively, the control unit may be configured for forwarding the temporarily buffered portions of the fluidic sample for further separation in an order which differs from an order according to which the portions have been inserted in the buffer volumes. For instance in a two-dimensional sample separation device (in particular chromatographic sample separation device), sections of a fluidic sample separated in the first separation dimension can be temporarily buffered in sample loops connected to a fluidic valve. For preventing carryover of sample, such a sample buffering and subsequent forwarding to the second separation dimension has been carried out conventionally in a "first in, first out" architecture, so that the sequence of supplying sample sections to the sample loops and the sequence of forwarding these sample sections to the second separation dimension were selected identical in a conventional approach. By bracketing sections of the fluidic sample between mobile phase portions of higher solvent strength, carryover issues can be suppressed so efficiently that a "first in, first out" rule is not mandatory. In contrast to this, the order of buffering and forwarding sample sections can be selected freely in accordance with the requirements of a specific application.

In an embodiment, the control unit is configured for releasing fluidic sample adsorbed on the sample separation unit by driving an eluent through only part of conduits flown through by the fluidic sample. Thus, conducting an eluent through all conduits through which also the fluidic sample has flown may become dispensable, because the presence of mobile phase portion(s) with higher solvent strength directly adjacent to the fluidic sample may avoid fluidic sample from unintentionally adhering to said conduits. Driving eluent only along a short path may simplify operation of the sample separation device.

In an embodiment, the at least one mobile phase portion with the higher solvent strength comprises a mobile phase portion arranged in a flowing direction directly behind the fluidic sample (this can be accomplished by a corresponding control by the control unit). Descriptively speaking, such a mobile phase portion with higher solvent strength following the fluidic sample may function as a sample collecting plug collecting any sample adsorbed on conduit walls in view of the higher solvent strength. This may suppress carryover and prevent sample loss.

In an embodiment, the mobile phase portion arranged in the flowing direction directly behind the fluidic sample is driven through the sample separation unit (this can be accomplished by a corresponding control by the control unit). Since such a mobile phase portion with higher solvent strength following the fluidic sample may collect lost sample material, said mobile phase portion may be intentionally guided through the stationary phase of the sample separation unit so that the recollected sample material within the mobile phase portion may then be made subject to separation as well.

In an embodiment, the at least one mobile phase portion with the higher solvent strength comprises a mobile phase portion arranged in a flowing direction directly before the fluidic sample (this can be accomplished by a corresponding control by the control unit). Descriptively speaking, such a mobile phase portion with higher solvent strength preceding the fluidic sample may clean conduit walls by for instance desorbing any historic sample from the conduit walls thanks to the high solvent strength of said mobile phase portion.

In an embodiment, the mobile phase portion arranged in the flowing direction directly before the fluidic sample is prevented from flowing through the sample separation unit (this can be accomplished by a corresponding control by the control unit). In view of the cleaning function of the mobile phase portion with higher solvent strength preceding the fluidic sample (as described in the preceding paragraph), contaminants may accumulate in the preceding high solvent strength mobile phase portion. In order to ensure a highly accurate sample separation, the mobile phase portion with higher solvent strength and preceding the fluidic sample may be cut out from the flow stream and may thereby be removed from the fluidic sample before reaching the sample separation unit.

In an embodiment, at least one of the mobile phase portions arranged directly next to the fluidic sample has a lower solvent strength compared to a solvent of the fluidic sample (this can be accomplished by a corresponding control by the control unit). Thus, it may be sufficient that only one side of the fluidic sample is directly connected to a mobile phase portion with relatively higher solvent strength. The other side may be connected with a mobile phase portion having a relatively lower solvent strength. This may combine the advantages of a suppression of sample carry-over, loss and precipitation with a proper focusing of the fluidic sample on the sample separation unit.

Embodiments of the invention may be implemented in conventionally available HPLC systems, such as the Agilent 1200 (or 1290) Series Rapid Resolution LC system or the Agilent 1150 HPLC series (both provided by the applicant Agilent Technologies—see www.agilent.com).

One embodiment of a sample separation device comprises a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The separation unit of the sample separation device preferably comprises a chromatographic column (see for instance en.wikipedia.org/wiki/Column_chromatography) providing a stationary phase. The column may be a glass or steel tube (for instance with a diameter from 50 µm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation, water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (150 to 1500 bar), and more particularly 50-120 MPa (500 to 1200 bar).

The sample separation device, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1150 HPLC series, both provided by the applicant Agilent Technologies, under www.agilent.com.

Embodiments of the invention can be partly or entirely embodied or supported by one or more suitable software programs, which can be stored on or otherwise provided by any kind of data carrier, and which might be executed in or by any suitable data processing unit. Software programs or routines can be preferably applied in or by the control unit.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

The illustrations in the drawings are schematic.

DETAILED DESCRIPTION

Before describing the figures in further detail, some basic considerations of the present invention will be summarized based on which exemplary embodiments have been developed.

According to an exemplary embodiment of the invention, a fluidic sample may be bracketed with strong solvent.

Strong solvent may thus be used for transportation and enclosing of the fluidic sample. In an embodiment, this may be advantageously combined with the concept of feed injection and/or with the concept of two-dimensional sample separation.

Conventionally, it may be possible to bracket a sample plug with a weak solvent to enhance initial sample sorption to the column (which may be denoted as stacking). In fundamental contrast to this, an exemplary embodiment of the invention brackets a sample with strong solvent, in particular once feed injection technology is used for sample introduction onto a separation column.

In conventional chromatographic applications, it is usually considered advantageous to bracket the fluidic sample in the flow path with portions (also denoted as plugs) of a chromatographically weak solvent, especially if the original solvent of the sample is strong. This facilitates initial adsorption of the sample components to the stationary phase in the chromatographic column (for trapping) and prevents breakthrough or peak shape distortion of weakly retained sample components.

However, it has been found by the present inventors that this conventional approach bears also a risk of sample precipitation or sticking of sample components to the inner walls of the liquid chromatography system. These risks are especially pronounced for systems, in which not the entire sample path is flown through by the eluent gradient and thus will not be exposed to strong solvent composition, such as feed injection systems, two-dimensional liquid chromatography engaging feed injection or two-dimensional liquid chromatography engaging aliquot buffering in a dedicated buffer loop and drawing it back for further injection.

In order to efficiently suppress the described risks, an exemplary embodiment of the invention advantageously brackets the sample with chromatographically strong solvent (or more precisely with chromatographically stronger solvent as compared to a solvent of the fluidic sample itself). Further advantageously, any danger of peak distortion and breakthrough can be easily mitigated by subsequent reduction of solvent strength by appropriate solvent modulation during feed injection.

In particular, it may be possible and advantageous to use a chromatographically strong solvent (with respect to the chromatographic system engaged in the second separation dimension) as mask solvent and also as the solvent provided by the modulation or metering syringe. Such a concept may be advantageously applied also to other separation tasks and is not limited to two-dimensional liquid chromatography related applications involving feed injection technology. During the feed injection of a sample bracketed with strong solvent, it may be in particular possible to provide a dilution factor which is variable over time. Additionally or alternatively, it may be possible to provide a composition of the diluent (main solvent flow), in order to better control the solvent composition downstream of a feed injection point.

Figure 1:
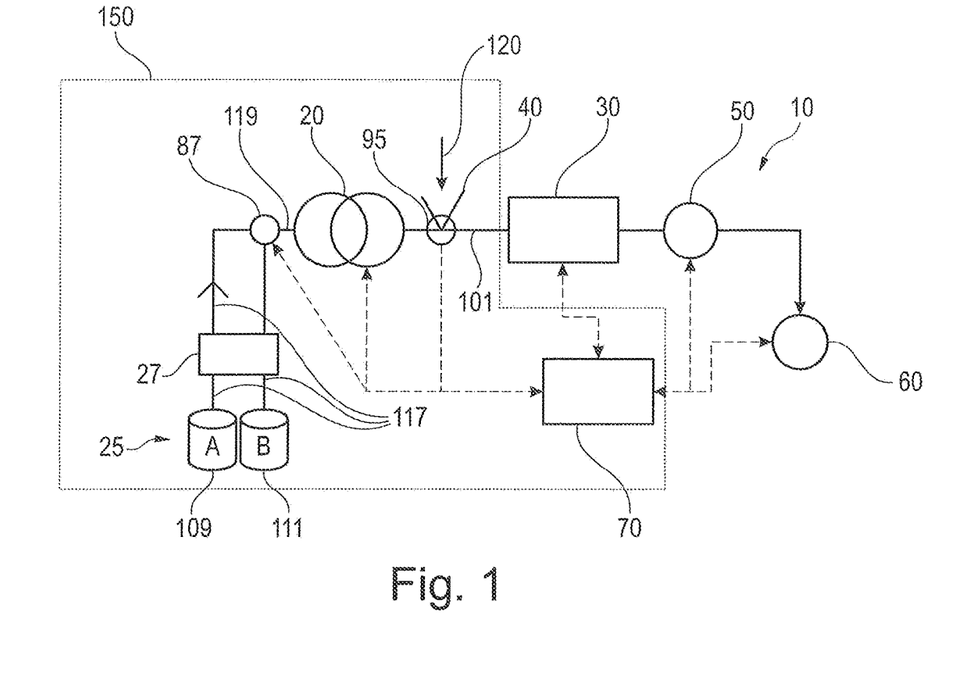
FIG. 1 shows a liquid sample separation device in accordance with embodiments of the present invention, particularly used in high performance liquid chromatography (HPLC).

Referring now in greater detail to the drawings, FIG. 1 depicts a general schematic of a liquid separation system as example for a sample separation device 10 according to an exemplary embodiment of the invention. A fluid drive 20 (such as a piston pump) receives a mobile phase from a solvent supply 25 via degassing unit 27, which degases and thus reduces the amount of dissolved gases in the mobile phase. The fluid drive 20 drives the mobile phase through a separation unit 30 (such as a chromatographic column) comprising a stationary phase. A sampler or injector 40, implementing a fluidic valve 95, can be provided between the fluid drive 20 and the separation unit 30 in order to subject or add (often referred to as sample introduction) a sample fluid into the mobile phase so that a fluidic sample and mobile phase may be provided towards a separation path where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the fluid drive 20, so that the fluid drive 20 already receives and pumps the mixed solvents as the mobile phase. Alternatively, the fluid drive 20 may comprise plural individual pumping units, with plural of the pumping units each receiving and pumping a different solvent or mixture, so that the mixing of the mobile phase (as received by the separation unit 30) occurs at high pressure and downstream of the fluid drive 20 (or as part thereof). The composition of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the devices in the sample separation device 10 in order to receive information and/or control operation. For example, the control unit 70 may control operation of the fluid drive 20 (for example setting control parameters) and receive therefrom information regarding the actual working conditions (such as output pressure, etc. at an outlet of the pump). Optionally, the control unit 70 may also control operation of the solvent supply 25 (for example setting the solvent/s or solvent mixture to be supplied) and/or the degassing unit 27 (for example setting control parameters and/or transmitting control commands) and may receive therefrom information regarding the actual working conditions (such as solvent composition supplied over time, vacuum level, etc.). The control unit 70 may further control operation of the sampling unit or injector 40 (for example controlling sample injection or synchronization of sample injection with operating conditions of the fluid drive 20). The separation unit 30 may also be controlled by the control unit 70 (for example selecting a specific flow path or column, setting operation temperature, etc.), and send-in return-information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detector 50) and provides data back.

FIG. 1 also shows a liquid supply device 150 configured for metering liquids in controlled proportions and for supplying a result as mobile phase. The liquid supply device 150 comprises in the shown example two reservoirs 109, 111 each containing a respective solvent component A (in this example water), B (in this example a buffer, i.e. salt dissolved in a solvent). Moreover, it is possible to provide one or more additional and/or alternative reservoirs, for instance an additional reservoir comprising an organic solvent, a further reservoir comprising an optional organic modifier, etc. Each of the reservoirs 109, 111 is fluidically connected via a respective liquid supply line 117 and via the degassing unit 27 with a proportioning unit 87 which may be configured as proportioning valve. The proportioning unit 87 is configured to connect a selected one of the liquid supply lines 117 with a supply line or conduit 119 guiding towards the fluid drive 20, and to switch between different liquid supply lines 117. The supply line or conduit 119 is connected with an inlet of the fluid drive 20. Hence, solvent blending is performed at the low-pressure side of the fluid drive 20 by metering or proportioning a sequence of fluidic portions.

Figure 2:
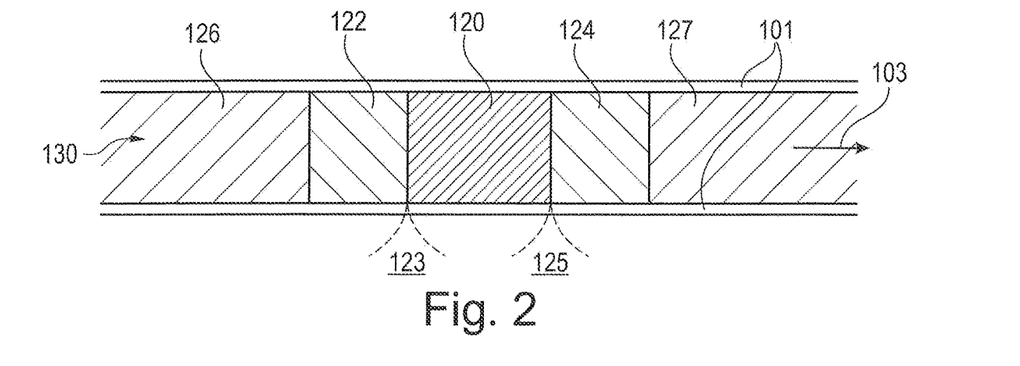
FIG. 2 shows a fluid stream according to an exemplary embodiment of the invention obtainable by using the sample separation device of FIG. 1.

FIG. 2 shows a fluid stream 130 flowing through a conduit 101 (shown in FIG. 1 as well) along a flowing direction 103 according to an exemplary embodiment of the invention which may be provided by the liquid supply device 150 of FIG. 1. For instance, conduit 101 shown in FIG. 2 may correspond to the conduit between injector 40 and sample separation unit 30 of FIG. 1.

As shown in FIG. 2, the fluid stream 130 provided upstream of sample separation unit 30 may comprise a plug of chromatographic sample 120 directly between two mobile phase portions 122, 124 of higher solvent strength (e.g., a second solvent strength) compared to a solvent of the chromatographic sample 120 itself (e.g., having a first solvent strength). Advantageously, the control unit 70 is configured for controlling the proportioning unit 87, the injector 40 and the fluidic valve 95 for bracketing the plug of fluidic sample 120 directly between the two mobile phase portions 122, 124 of higher solvent strength compared to a solvent of the fluidic sample 120. As shown as well in FIG. 2, the control unit 70 may be further configured for supplying a (first) further mobile phase portion 126 (of a further mobile phase) of lower solvent strength (e.g., a third solvent strength) directly following the mobile phase portion 122 of the higher solvent strength following, in turn, the fluidic sample 120. Correspondingly, the control unit 70 may also be configured for supplying yet another (second) further mobile phase portion 127 (of the further mobile phase) of lower solvent strength (e.g., the third solvent strength) directly preceding the mobile phase portion 124 of the higher solvent strength. Advantageously, the further mobile phase portions 126, 127 may have a lower solvent strength than the mobile phase portions 122, 124 of the higher solvent strength and also than the solvent of the fluidic sample 120. Accordingly, the (second) solvent strength of one or both mobile phase portions 122, 124 may be higher than the (first) solvent strength of the fluidic sample 120 and the (third) solvent strength of one or both further mobile phase portions 126, 127.

For example, the fluidic sample 120 itself may be located inside a mobile phase which may be a mixture between water and an organic solvent at a first concentration. Each of the mobile phase portions 122, 124 may be a mixture between water and said organic solvent at a second concentration, wherein the second concentration may be higher than the first concentration. The further mobile phase portions 126, 127 may be a mixture between water and said organic solvent at a third concentration, wherein the third concentration may be lower than both the first concentration and the second concentration.

With the described sequence of fluid packets according to FIG. 2, carryover, loss and precipitation of sample may be prevented while simultaneously obtaining a sufficient focusing of the fluidic sample 120 on the sample separation unit 30. High solvent strength mobile phase portion 122 directly behind (or downstream of) fluidic sample 120 may desorb and collect any fluidic sample which unintentionally adsorbs at inner walls of conduit 101. High solvent strength mobile phase portion 124 directly before (or upstream of) fluidic sample 120 may desorb and collect any historic contaminant which may be present at inner walls of conduit 101. Low solvent strength mobile phase portion 126 may contribute to a proper focusing of the fluidic sample 120 on the stationary phase of the sample separation unit 30.

In order to further improve focusing of the fluidic sample 120 at the sample separation unit 30, the liquid supply device 150 and in particular the control unit 70 may be further configured for arranging respective further (or additional) mobile phase portions 123, 125 with a lower solvent strength (e.g., a fourth solvent strength) compared to a solvent of the fluidic sample 120 directly next to the fluidic sample 120 before the fluidic sample 120 reaches the sample separation unit 30. As indicated schematically in FIG. 2, the (first) further (or additional) mobile phase portion 123 may be interposed directly between the mobile phase portion 122 and the fluidic sample 120. Correspondingly, the (second) further (or additional) mobile phase portion 125 may be interposed directly between the mobile phase portion 124 and the fluidic sample 120. Referring to FIG. 1, the opportunity to supply the further (or additional) mobile phase portions 123, 125 may be accomplished for example by an additional fluidic valve and/or an additional fluidic coupling point (not shown) downstream of the injector 40 and upstream of the sample separation unit 30. As a result, it may be ensured that the fluidic sample 120 is no longer directly next to the high solvent strength mobile phase portions 122, 124 when the fluidic sample 120 reaches the sample separation unit 30. Consequently, the fluidic sample 120 may be properly focused on the stationary phase of sample separation unit 30.

The mobile phase portion 122 arranged in the flowing direction directly behind or after the fluidic sample 120 may be driven, together with fluidic sample 120, through the sample separation unit 30, i.e. directly after driving the fluidic sample 120 through the sample separation unit 30. Since the mobile phase portion 122 may collect residues of sample material lost from the plug of fluidic sample 120, driving the mobile phase portion 122 through the sample separation unit 30 may ensure advantageously that the vast majority of sample material is in fact separated.

What concerns the mobile phase portion 124 arranged in the flowing direction 103 directly before or in front of the fluidic sample 120, it may be optionally advantageous to prevent said mobile phase portion 124 from flowing through the sample separation unit 30. As explained above, mobile phase portion 124 may clean interior walls of conduit 101 before fluidic sample 120 passes said walls. Hence, it may happen that small residues of historic sample and/or contaminants will be included in mobile phase portion 124. If this is the case, it may be optionally advantageous to remove mobile phase portion 124 from the fluid stream 130 before mobile phase portion 124 arrives at the sample separation unit 30. It can then be ensured that said historic sample and/or contaminant deteriorates the separation accuracy of fluidic sample 120. Removing or cutting out mobile phase portion 124 upstream of sample separation unit 30 may for instance be accomplished by an additional fluidic valve and/or an additional fluidic coupling point (not shown) downstream of the injector 40 and upstream of the sample separation unit 30.

Alternatively to FIG. 2, one of the mobile phase portions 122, 124 arranged directly next to the fluidic sample 120 may also have a lower solvent strength compared to a solvent of the fluidic sample 120 (not shown). Thus, it is also possible that only one of the two mobile phase portions 122, 124 has a higher solvent strength than the solvent of the fluidic sample 120.

Figure 3:
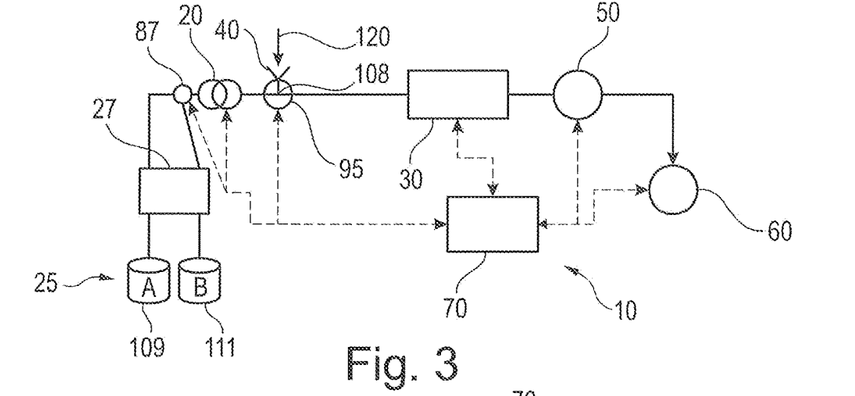
FIG. 3 shows a liquid sample separation device implementing feed injection in accordance with embodiments of the present invention, particularly used in high performance liquid chromatography (HPLC).

FIG. 3 depicts a sample separation device 10 according to another exemplary embodiment of the invention which involves feed injection.

The embodiment of FIG. 3 differs from the embodiment of FIG. 1 in particular in that, according to FIG. 3, the fluidic valve 95 can be brought into a switching state in which a fluidic T-piece (see reference numeral 108 indicating a fluidic coupling point) is formed within the fluidic valve 95, thereby fluidically coupling the fluid drive 20, the separation unit 30, and a sample accommodation volume (compare vertical arrow in FIG. 3) of the injector 40 in the shown injection switching state. Fluidic sample 120 and mobile phase may be provided as a fluid stream 130, for instance in accordance with FIG. 2.

FIG. 4 to FIG. 7 illustrate an injector 40 (and connected components) according to an exemplary embodiment of the invention (and in particular as an example for injector 40 of FIG. 3) in different switching states.

The injector 40 according to FIG. 4 to FIG. 7 is configured for injecting a fluidic (here: liquid) sample into a flow path 104 between high pressure fluid drive 20 (configured for pumping mobile phase, i.e. a definable solvent composition) and separation unit 30, embodied as a chromatographic column. For the purpose of separating the fluidic sample 120 into fractions, the injector 40 comprises a sample loop or sample accommodation volume 100 for accommodating a certain amount of the fluidic sample 120 prior to injecting. A sample drive 102, which can be embodied as a metering pump or syringe pump, is configured for driving the fluidic sample 120 from the sample accommodation volume 100 into the flow path 104, when fluidic valve 95 is switched into a corresponding switching state (see FIG. 6). For driving the fluidic sample 120 towards the separation unit 30, a piston 188 of the sample drive 102 is controlled to move forwardly. Sample drive 102 is further configured for intaking fluidic sample 120 from a sample container (not shown) into the sample accommodation volume 100 by a backward motion of the piston 188. The fluidic valve 95 can be switched in multiple switching states under control of control unit 70 (see FIG. 4 to FIG. 7). By switching the fluidic valve 95, it is possible to selectively couple the sample accommodation volume 100 with the flow path 104 (see for instance FIG. 6) or decouple the sample accommodation volume 100 from the flow path 104 (see for instance FIG. 4 or FIG. 5). The control unit 70 may be configured for adjusting an outlet pressure value and/or an outlet volumetric flow rate value (alternatively an outlet mass flow rate value) according to which the mobile phase and the fluidic sample 120 are driven to the separation unit 30.

The fluidic valve 95 is a rotatable fluidic valve 95 having a rotor and a stator being rotatable relative to one another so as to bring different fluid ports 1-6 of the stator in alignment with respective fluidic conduits 110 in the rotor. As indicated with reference numeral 155 in FIG. 4 to FIG. 7, part of the fluidic conduits 110 may be embodied as stator grooves, whereas the rest of the fluid conduits 110 (not being indicated with reference numeral 155) are embodied as a rotor grooves according to FIG. 4 to FIG. 7. The fluidic valve 95 is an active fluidic valve being switchable under control of control unit 70 of the injector 40.

The injector 40 comprises a needle 112 and a seat 114 configured for accommodating the needle 112. Although not shown in the figures, the needle 112 is drivable towards a sample container (not shown) for intaking fluidic sample 120 stored in the sample container into the sample accommodation volume 100 by the sample drive 102. The needle 112 is furthermore configured to be drivable back to the seat 114 (as shown in FIG. 4 to FIG. 7) prior to injection. Reference numeral 166 indicates a waste.

Figure 4:
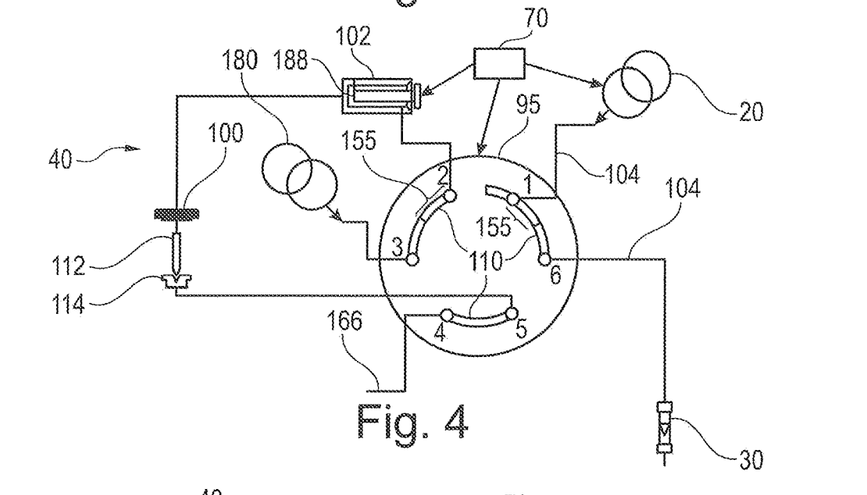
FIG. 4 illustrates an injector according to an exemplary embodiment of the invention.

Referring to FIG. 4, a purge position of the fluidic valve 95 of the injector 40 is shown. According to FIG. 4, the fluid drive 20 or analytical pump is fluidically connected to separation unit 30 embodied as liquid chromatography column. In the shown purge position, loop or sample accommodation volume 100, needle 112, seat 114, and sample drive 102 embodied as metering device are connected to an optional flush pump 180.

In the switching state according to FIG. 4, a fluidic connection is established from the fluid drive 20 via fluidic ports 1, 6 and conduits 110, 155 of the fluidic valve 95 up to separation unit 30. A further fluidic connection is established from flush pump 180 via fluidic ports 2, 3 and conduits 110, 155 of fluidic valve 95, sample drive 102, sample accommodation volume 100, needle 112, seat 114, back to fluidic valve 95 and from there to waste 166.

Figure 5:
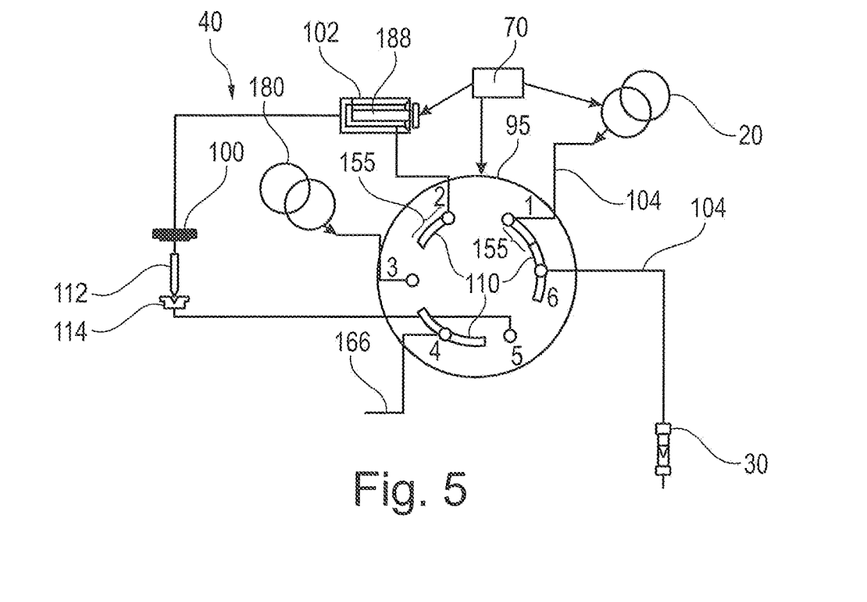
FIG. 5 illustrates the injector shown in FIG. 4 in a different switching state.

Now referring to the switching state of FIG. 5, the sample drive 102 is operable and the fluidic valve 95 is switched into a draw and decompress/compress switching state in which a predefined overpressure is adjustable in the sample accommodation volume 100 before switching the fluidic valve 95 for injecting the fluidic sample towards the separation unit 30.

In the draw and de-/compress position of the fluidic valve 95 according to FIG. 5, the fluid drive 20 or analytical pump is connected to separation unit 30 or liquid chromatography column. Sample accommodation volume 100 (also denoted as loop), needle 112, seat 114, and sample drive 102 or metering device are blocked. Hence, decompressing or compressing fluid within the injector 40 is possible in the switching state according to FIG. 5. Furthermore, it is possible to draw fluidic sample 120 in the switching state according to FIG. 5.

In the switching state according to FIG. 5, a fluidic connection is established from the fluid drive 20 via fluidic ports 1, 6 and conduits 110, 155 of the fluidic valve 95 up to separation unit 30. The flush pump 180 is disconnected. A further fluidic connection is established from sample drive 102, via sample accommodation volume 100, needle 112, seat 114, back to blocked fluidic port 5 of fluidic valve 95.

Figure 6:
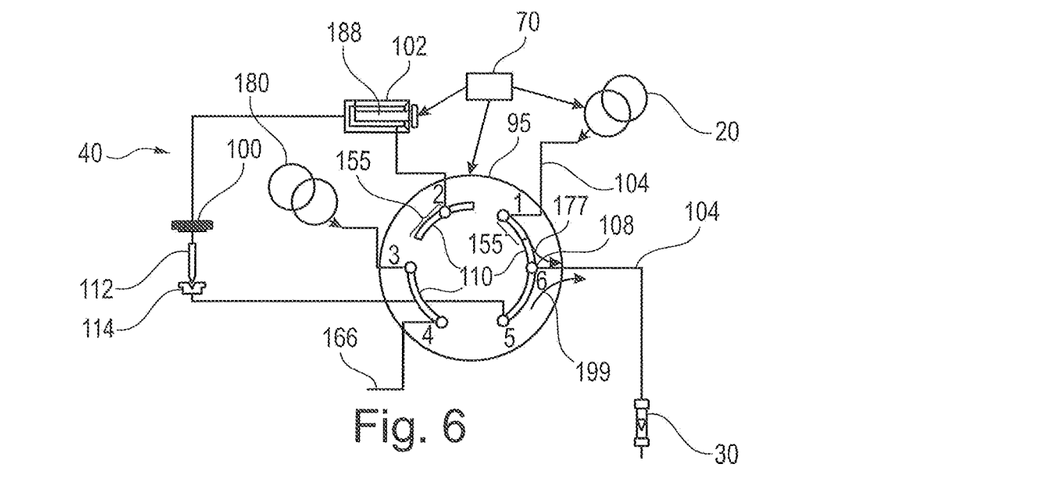
FIG. 6 illustrates the injector shown in FIG. 4 in a different switching state.

Referring to FIG. 6, the fluidic valve 95 has been switched to a feed inject position. Now, fluid drive 20 is fluidically connected to the same flow path 104 to which also sample drive 102 is fluidically connected. Sample accommodation volume 100, needle 112, seat 114, and sample drive 102 are fluidically connected to valve-internal fluidic T-piece or fluidic coupling point 108 which is formed by and located at the position of static fluidic port 6 (compare FIG. 6). By defining the fluidic coupling point 108 or the bifurcation point of the fluidic T-piece by static fluidic port 6 and hence as part of the stator of the fluidic valve 95, a particularly precisely defined and reproducible fluidic coupling point 108 may be established with low or no dead volume. With a plunger movement of the sample drive 102 or metering device, the previously intaken fluidic sample 120 can be injected towards separation unit 30.

More particularly, in an injection switching state of the fluidic valve 95 as shown in FIG. 6, the fluid drive 20, the separation unit 30 and the sample drive 102 are fluidically coupled by the fluidic valve 95 so that fluid (such as the fluidic sample 120) driven by the sample drive 102 and flowing from the sample accommodation volume 100 to the separation unit 30 and further fluid (such as mobile phase portions 122, 124 bracketing the fluidic sample 120 and having a higher solvent strength compared to the solvent of the fluidic sample 120) driven by the fluid drive 20 and flowing from the fluid drive 20 to the separation unit 30 are combined to a sequence of plugs (for instance in the way as shown in FIG. 2) at fluidic coupling point 108 upstream of the separation unit 30. The combination of the fluid streams at fluidic connection 108 are indicated in FIG. 6 by arrows 177, 199. Hence, the fluid streams combine at the fluidic coupling point 108 to a common fluid stream (for instance a sequence of plugs 122-120-124, as shown in FIG. 2) flowing towards the separation unit 30. In the injection switching state according to FIG. 6, the control unit 70 can also be configured for adjusting the partial volumes or masses of mobile phase portions 122, 124 driven by the fluid drive 20 and fluidic sample 120 driven by the sample drive 102 towards the separation unit 30 at the fluidic coupling point 108. In the injection switching state of the fluidic valve 95, the fluid drive 20, the separation unit 30 and the sample drive 102 are fluidically coupled at fluidic coupling point 108 which is defined by the fluidic valve 95. More precisely, the fluidic coupling point 108 is located in an interior of the active fluidic valve 95 in this switching position according to FIG. 6.

In the switching state according to FIG. 6, a fluidic connection is established from the fluid drive 20 via fluidic ports 1, 6 and conduits 110, 155 of the fluidic valve 95 up to separation unit 30. The flush pump 180 is disconnected. A further fluidic connection is established from sample drive 102, via sample accommodation volume 100, needle 112, and seat 114, back to fluidic port 5 of fluidic valve 95 and from there to fluidic coupling point 108. At fluidic coupling point 108, the fluid streams originating from fluid drive 20 and originating from sample drive 102 are combined.

Figure 7:
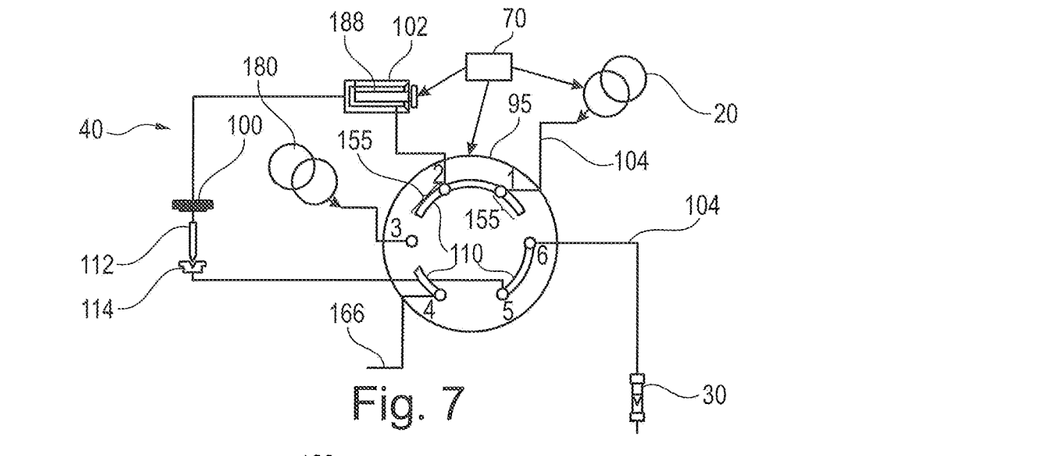
FIG. 7 illustrates the injector shown in FIG. 4 in a different switching state.

Referring to FIG. 7, an inject position is shown.

In the switching position of the fluidic valve 95 according to FIG. 7, the fluidic sample 120 bracketed between mobile phase portions 122, 124 is injected towards the separation unit 30 driven by the fluid drive 20 while the sample accommodation volume 100 is located downstream of the fluid drive 20 and upstream of the separation unit 30. Hence, the fluidic valve 95 does not form (or no longer forms) a fluidic T-piece between fluid drive 20, separation unit 30, and sample accommodation volume 100 in the further injection switching state according to FIG. 7. In contrast to this, a continuous fluid connection is established from fluid drive 20, via fluid valve 95, sample drive 102, sample accommodation volume 100, needle 112, seat 114, again fluidic valve 95, and separation unit 30. In this other injection switching state, fluid driven by the fluid drive 20 flows through the sample drive 102 and the sample accommodation volume 100 before flowing to the separation unit 30.

As can be taken from a comparison of FIG. 6 and FIG. 7 differing substantially concerning a switching position of fluidic valve 95, the control unit 70 is configured for controlling switching of the fluidic valve 95 so as to select one of:

- a feed injection mode in which the fluidic sample is injected in the injection switching state (compare FIG. 6); or
- a flow-through mode in which the fluidic sample is injected in the other switching state (compare FIG. 7).

Figure 8:
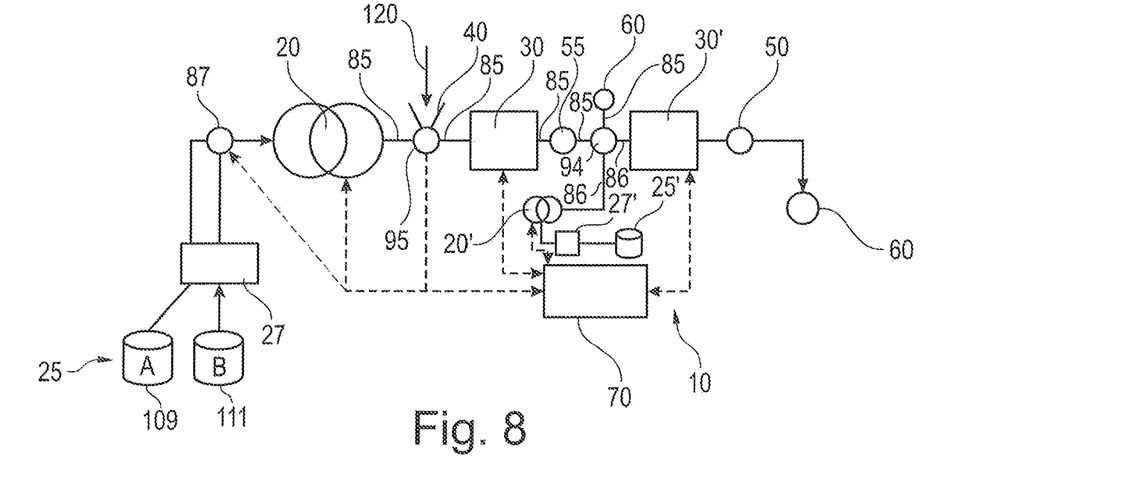
FIG. 8 illustrates a two-dimensional sample separation device according to an exemplary embodiment of the invention.

FIG. 8 depicts a sample separation device 10 according to yet another exemplary embodiment of the invention which involves two-dimensional sample separation.

The embodiment of FIG. 8 differs from the embodiment of FIG. 1 in particular in that, according to FIG. 8, a second separation dimension is added in which a fluidic sample 120, already separated in a first separation dimension, is additionally separated in the second separation dimension.

A first pump operating as first fluid drive unit 20 receives a mobile phase from a first solvent supply 25, typically via a first degasser 27. The first fluid drive unit 20 drives the mobile phase (for instance forming mobile phase portions 122, 124 of high solvent strength) through a first separating unit 30. A sampling unit or injector 40 can be provided between the first fluid drive unit 20 and the first separating unit 30 in order to add fluidic sample 120 into the mobile phase. The stationary phase of the first separating unit 30 is configured for separating compounds of the sample liquid.

A second pump, as second fluid drive unit 20', receives another mobile phase from a second solvent supply 25', typically via a second degasser 27'. By a fluidic valve 94, the first dimension (reference numerals 20, 30, . . . ) of the two-dimensional liquid chromatography system of FIG. 8 may be configured to provide fluidic segments or portions to the second dimension (reference numerals 20', 30', . . . ). The fluidic sample 120 is separated into multiple fractions by the first dimension, and each fraction, or a part/slice of it, is modulated into the second separation path and further separated into multiple sub-fractions by second sample separation unit 30' of the second dimension.

Detector 50 is provided for detecting separated compounds of the fluidic sample 120. An optional further detector 55 is arranged upstream of the fluidic valve 94 and may be used for operating the sample separation device 10 in a heart-cutting operation. It can however also be used in comprehensive mode as well as in any other operation mode for monitoring or evaluation of the chromatographical data of the first dimension. A respective fractionating unit 60 can be provided for outputting separated compounds of sample fluid. It is also possible that the processed fluid is pumped towards a waste.

Control unit 70 may control the various components of the sample separation device 10 according to FIG. 8, in particular the fluid drive units 20, 20', the injector 40, fluidic valve 94, the separating units 30, 30', the detectors 50, 55, proportioning unit 87, etc.

The first fluid drive unit 20 is hence configured for driving a first fluid (composed of the injected fluidic sample 120 and the mobile phase, which may comprise mobile phase portions 122, 124, etc.) along a first flow path 85. The second fluid drive unit 20' is configured for driving a second fluid embodied as a mobile phase along a second flow path 86. The fluidic valve 94 is fluidically coupled to both the first flow path 85 and to the second flow path 86 and is switchable by the control unit 70 for transferring part of the first fluid from the first flow path 85 into the second flow path 86. The fluid processing device 10 shown in FIG. 8 is configured as a two-dimensional sample separation device configured for separating the first fluid into fractions (which can be detected by detector 55) and at least one of the fractions of the transferred first fluid into sub-fractions (which can be detected by detector 50).

Figure 9:
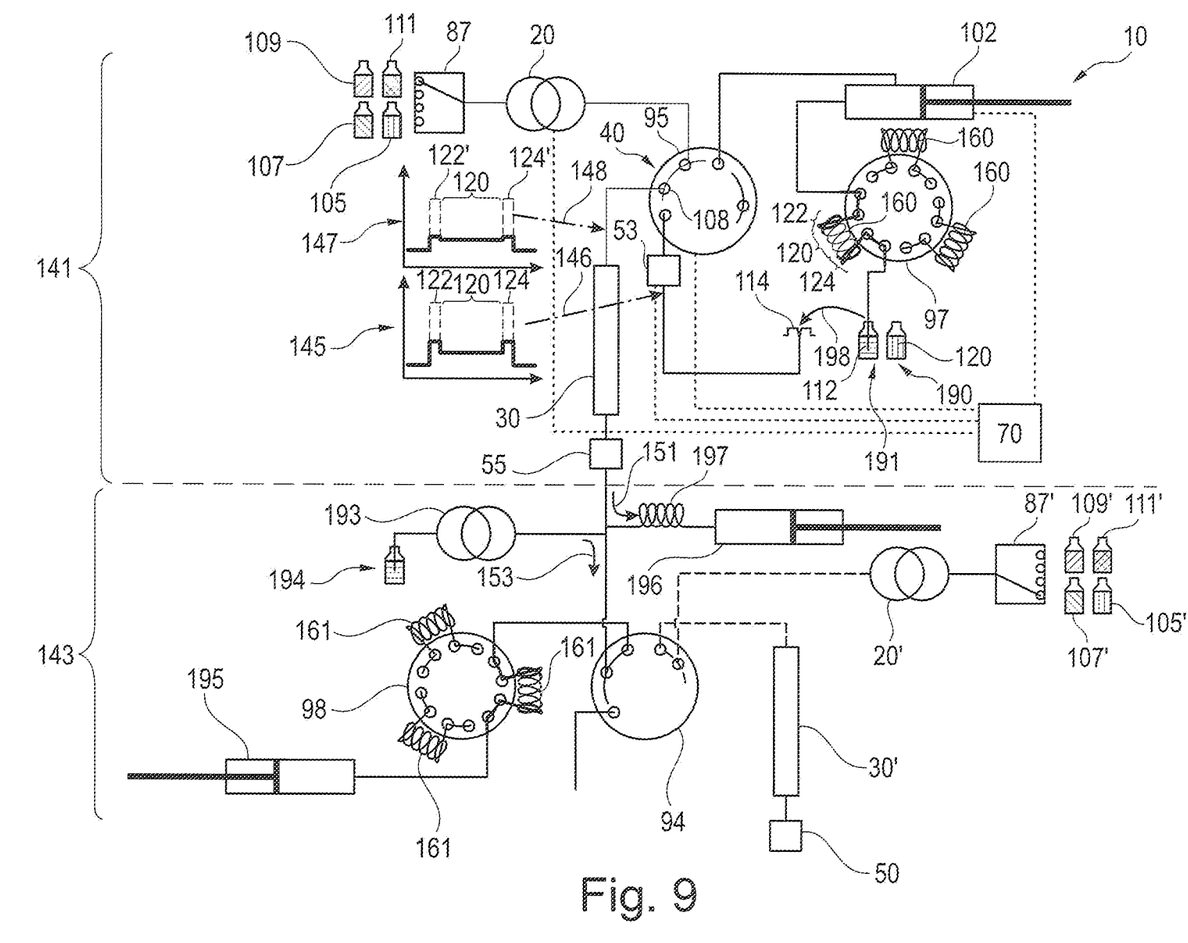
FIG. 9 illustrates a two-dimensional sample separation device with feed injection according to an exemplary embodiment of the invention.

FIG. 9 illustrates a two-dimensional sample separation device 10 with feed injection according to an exemplary embodiment of the invention. A first separation dimension is denoted with reference sign 141, whereas a second separation dimension is denoted with reference sign 143.

Referring now in further detail to the first separation dimension 141, four different solvent reservoirs 105, 107, 109, 111, each containing a respective solvent, are provided as a basis for creating a mobile phase. Proportioning unit 87 (which may be embodied as a quaternary valve) is switchable under control of control unit 70 so as to adjust a solvent composition (for instance with a low solvent strength) with constituents from reservoirs 105, 107, 109, 111.

Moreover, a sample reservoir 190 is provided which contains fluidic sample 120. Furthermore, a strong solvent reservoir 191 is provided which contains solvent with a high solvent strength. Apart from fluidic valve 95 of injector 40, the first separation dimension 141 comprises a further fluidic valve 97 having a plurality of buffer volumes 160. Each buffer volume 160 is embodied as loop connected between two assigned ports of the further fluidic valve 97. Fluidic valve 97 is furthermore fluidically coupled with a sample drive 102 embodied as metering syringe. Needle 112 is presently immersed in solvent reservoir 191 for aspirating strong solvent into a fluidically connected buffer volume 160 by withdrawing a piston of sample drive 102. Alternatively, needle 112 can also be immersed in sample reservoir 190 for aspirating fluidic sample 120 into a fluidically connected buffer volume 160 by withdrawing the piston of sample drive 102. As indicated in FIG. 9, the buffer volume 160 which is connected to needle 112 according to FIG. 9 includes a sequence of packets or plugs in form of fluidic sample 120 of lower solvent strength between mobile phase portions 122, 124 of higher solvent strength. In another operation mode (not shown), needle 112 may be moved into seat 114 for transferring fluid packet sequence 124-120-122 towards (optional, but advantageous) detector 53 and from there to fluidic valve 95 (which may also be denoted as injector valve). Said motion of needle 112 is indicated schematically by reference sign 198. For instance, detector 53 may measure a composition of the flowing fluid, which can be used for controlling the timing of the described operation, under control out of control unit 70.

A first diagram 145 illustrates a solvent strength profile along the flowing fluid at a position between needle seat 114 and fluidic valve 95 and being denoted with reference sign 146. Since the solvent strength of mobile phase portions 122, 124 is significantly higher than solvent strength of fluidic sample 120, the profile shown in the first diagram 145 is very pronounced. Advantageously, this prevents sample carryover, loss and precipitation along the flow path up to fluidic valve 95.

A second diagram 147 illustrates a solvent strength profile along the flowing fluid at a position between fluidic valve 95 and sample separation unit 30 as denoted with reference sign 148. Since the mobile phase provided by fluid drive 20 has a lower solvent strength than mobile phase portions 122, 124, the profile shown in the second diagram 147 is less pronounced than in the first diagram 145 (the modification of the mobile phase portions 122, 124 by the mobile phase provided by the fluid drive 20 is indicated schematically in the second diagram 147 by reference signs 122' and 124'). Advantageously, this dilution ensures proper focusing of the fluidic sample 120 at the inlet of sample separation unit 30. Thus, the control unit 70 is configured for reducing the solvent strength profile between the solvent of the fluidic sample 120 and the mobile phase portions 122, 124 with the higher solvent strength before the fluidic sample 120 reaches the sample separation unit 30. In particular, the control unit 70 may be configured for selectively modifying a dilution factor of the fluidic sample 120 bracketed between mobile phase portions 122, 124 over time.

The fluidic sample 120 is then adsorbed at the stationary phase of sample separation unit 30. Thereafter, the separated fractions of the fluidic sample 120 may be released from the stationary phase by supplying a corresponding mobile phase by fluid drive 20, for instance in accordance with a gradient profile. As can be derived from FIG. 9, the control unit 70 may be configured for releasing fluidic sample 120 adsorbed on the sample separation unit 30 by driving an eluent through only part of conduits flown through by the fluidic sample 120 previously. This is advantageously possible without artifacts, since the fluidic sample 120 has been bracketed by high solvent strength mobile phase portions 122, 124 and thereby protected from being unintentionally adsorbed at conduit walls or the like. After sample separation in sample separation unit 30, the result of the first dimension separation can be detected by detector 55.

Concluding, the first separation dimension 141 realizes bracketing fluidic sample 120 between mobile phase portions 122, 124 of higher solvent strength for suppressing carryover of sample. Synergistically, this may be combined with a weakening of the solvent prior to sample separation unit 30 by combination of the fluid sequence 124-120-122 with mobile phase from fluid drive 20 having a lower solvent strength. By taking the latter measure, proper sample focusing may be achieved at the inlet of sample separation unit 30.

Referring now in further detail to the second separation dimension 143, four different solvent reservoirs 105', 107', 109', 111', each containing a respective solvent, are provided as a basis for creating a further mobile phase. Further proportioning unit 87' (which may be embodied as a quaternary valve) is switchable under control of control unit 70 so as to adjust a solvent composition with constituents from reservoirs 105', 107', 109', 111'.

The second separation dimension 143 comprises fluidic valve 94 for supplying sections of the already separated fluidic sample 120 to further sample separation unit 30' and then to detector 50 for detection. Moreover, the second separation dimension 143 comprises a further fluidic valve 98 for buffering portions of the fluidic sample 120 which have already been separated in the first separation dimension 141.

Each of a plurality of buffer volumes 161 (here embodied as loops) is connected between two assigned ports of fluidic valve 98 and is configured for temporarily buffering a portion of the fluidic sample 120 separated by the sample separation unit 30. Subsequently, the temporarily buffered portions of the fluidic sample 120 may be forwarded for further separation by the further sample separation unit 30'. Advantageously, the control unit 70 is configured for forwarding the temporarily buffered portions of the fluidic sample 120 for further separation in a freely selective order, i.e. not necessarily in accordance with a "first in, first out" policy. More specifically, the control unit 70 is configured for forwarding the temporarily buffered portions of the fluidic sample 120 for further separation in an order which differs from an order according to which the portions have been inserted in the buffer volumes 161.

FIG. 9 furthermore shows that the second separation dimension 143 comprises yet another fluid drive 193 driving mobile phase of high solvent strength stored in a further mobile phase container 194. Furthermore, additional metering syringes 195, 196 are provided, the latter one cooperating with a sample loop 197.

During operation of the sample separation device 10 of FIG. 9, needle 112 is operated in accordance with containers 190, 191 and sample drive 102 so that the shown sequence of fluidic packets 124-120-122 is arranged in the assigned buffer volume 160. After having moved needle 112 in seat 114, moving the piston of sample drive 102 in a forward direction will transfer fluid packets 124-120-122 into injector valve 95. In an appropriate switching state of injector valve 95, the fluid packets 124-120-122 will be diluted by mobile phase provided by fluid drive 20 for smoothing the pronounced solvent strength profile of diagram 145 to the less pronounced solvent strength profile of diagram 147. The combination of the mobile phase with the sequence of fluid packets 124-120-122 will occur at fluidic coupling point 108 in injector valve 95 by feed injection, i.e. by the combination of flows at fluidic coupling point 108. In order to ensure a focused adsorption of fluidic sample 120 on sample separation unit 30, the solvent strength of the mobile phase provided by fluid drive 20 may be lower than the solvent strength of mobile phase portions 122, 124 (and optionally also lower than the solvent strength of the solvent in which the fluidic sample 120 is present).

In the second separation dimension 143, the pre-separated fluidic sample 120 may be directed onto sample loop 197, as indicated by arrow 151. For instance, this may be accomplished by withdrawing a piston of push-pull metering syringe 196. Fluid drive 193, which may be denoted as mask flow pump, may provide a respective plug of mobile phase (from container 194) having a higher solvent strength than the fluidic sample 120. Such a plug may be added before and behind the fluidic sample 120. The respective plug of mobile phase may be supplied as indicated by arrow 153. More precisely, a front plug of mobile phase may be supplied by fluid drive 193, followed by a portion of the fluidic sample 120 (supplied by forwarding the piston of the metering syringe 196). After said portion of the fluidic sample 120, a back plug of mobile phase may be supplied by fluid drive 193. The sequence of front plug, fluidic sample 120 and back plug may then be forwarded through fluidic valve 94 into one of the buffer volumes 161 of the fluidic valve 98 and is properly protected from undesired adsorption and precipitation. Feed or metering syringe 195 may then, after appropriately switching fluidic valve 94, supply the sequence of front plug, fluidic sample 120 and back plug to the further sample separation unit 30' for further separation. Before said further separation, the sequence of front plug (having higher solvent strength), fluidic sample 120 (having lower solvent strength) and back plug (having higher solvent strength) may be diluted with a mobile phase from fluid drive 20' having a lower solvent strength than at least the front plug and the back plug for focusing purposes.

Again referring to the first dimension separation 141, solvent modulation may be volume-based or flow-based. It is however also possible that solvent modulation is signal-based (for instance in order to compensate for dispersion and/or diffusion). For the latter purpose, detector 53 may be provided (which may be placed before pressurizing the fluidic sample 120).

Referring again to push-pull metering syringe 196, it may operate in a half peak/half peak operation mode. For sample bracketing of flow, a first half volume of a segment of the effluent (for instance a peak or heart-cut) may be aspirated while the leading plug is injected by the mask flow pump (fluid drive 193). The first half volume may be injected into a second half volume. Effluent after the second half volume may be aspirated while the trailing plug is injected.

Still referring to FIG. 9, it is possible to discard the leading and trailing plugs to waste (for instance upstream of the separation column in the first separation dimension 141, not shown) since they may comprise impurities.

Furthermore, it may be possible to modulate individual snippets or cuts from the first separation dimension 141 in order to substantially have the same solvent content or concentration. An anti-gradient operation is possible.

Figure 10:
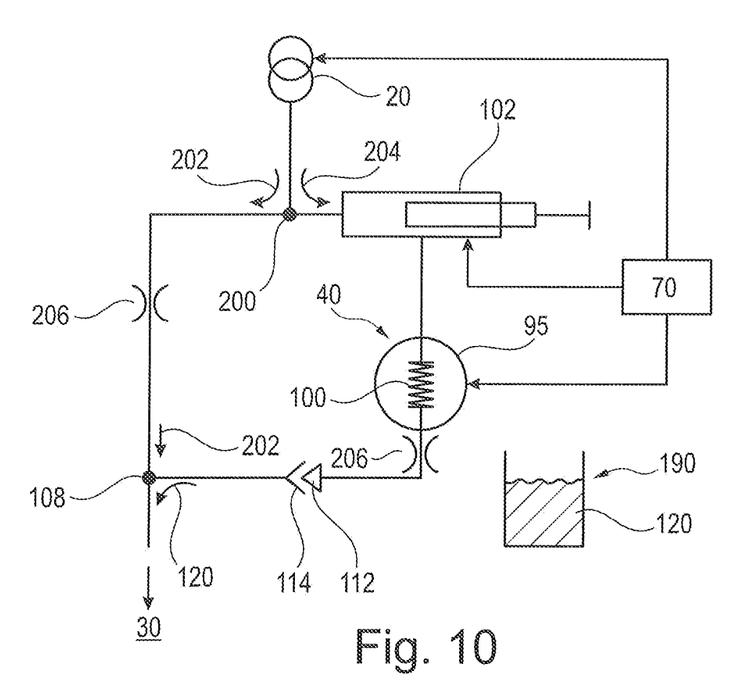
FIG. 10 illustrates a sample separation device with loop injection according to an exemplary embodiment of the invention.

FIG. 10 illustrates a fluid processing device of a sample separation device 10 with loop injection according to an exemplary embodiment of the invention.

According to FIG. 10, mobile phase is provided under control of a control unit 70 by a fluid drive 20. The mobile phase—which may have a higher solvent strength than a solvent of a fluidic sample 120—may be split at a fluidic splitting point 200 into two partial flows, as indicated by reference signs 202 and 204. Partial flow 202 is forwarded to a conduit where it passes a flow restriction 206 and is then forwarded to a fluidic coupling point 108. Partial flow 204 is supplied to a sample drive 102. Sample drive 102 is fluidically coupled with a sample accommodation volume 100, here embodied a sample loop, connected to an injector valve 95 of an injector 40. Needle 112 can be immersed into container 190 containing fluidic sample 120, so that fluidic sample 120 can be aspirated into the sample accommodation volume 100 by withdrawing a plunger of sample drive 102. After driving needle 112 back into seat 114, the plunger of sample drive 102 may be moved in a forward direction for supplying the fluidic sample 120 (followed by high solvent strength mobile phase) to fluidic coupling point 108. At the fluidic coupling point 108, the fluidic sample 120 may be bracketed directly between mobile phase portions of higher solvent strength. Thus, FIG. 10 shows an embodiment in which the injector 40 is configured for injecting the fluidic sample 120 into a flow path towards the sample separation unit 30 by combining the fluidic sample 120 with mobile phase portions of strong solvent at fluidic coupling point 108.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A method of separating a fluidic sample, the method comprising:
   providing a sample separation device comprising a fluid drive and a sample separation unit downstream from the fluid drive along a flow path;
   forming a fluid packet sequence comprising the fluidic sample bracketed between two mobile phase portions, wherein:
      one of the two mobile phase portions follows the fluidic sample and the other of the two mobile phase portions leads the fluidic sample;
      the fluidic sample has a first solvent strength; and
      at least one of the two mobile phase portions is arranged directly next to the fluidic sample and has a second solvent strength higher than the first solvent strength;
   driving a further mobile phase having a third solvent strength by the fluid drive along the flow path toward the sample separation unit, wherein the second solvent strength is higher than the third solvent strength;
   while driving the further mobile phase having the third solvent strength, injecting the fluid packet sequence into the flow path at a point between the fluid drive and the sample separation unit, wherein:
      the further mobile phase having the third solvent strength comprises one further mobile phase portion following the one of the two mobile phase portions that follows the fluidic sample, and another further mobile phase portion leading the other of the two mobile phase portions that leads the fluidic sample; and the fluid packet sequence is driven with the another further mobile phase having the third solvent strength toward the sample separation unit; and separating the fluidic sample into different fractions by the sample separation unit.

2. The method according to claim 1, wherein the at least one of the two mobile phase portions with the second solvent strength comprises a mobile phase portion arranged in a flowing direction directly behind the fluidic sample.

3. The method according to claim 2, wherein the mobile phase portion arranged in the flowing direction directly behind the fluidic sample is driven through the sample separation unit.

4. The method according to claim 1, wherein the at least one of the two mobile phase portions with the second solvent strength comprises a mobile phase portion arranged in a flowing direction directly before the fluidic sample.

5. The method according to claim 4, wherein the mobile phase portion arranged in the flowing direction directly before the fluidic sample is prevented from flowing through the sample separation unit.

6. The method according to claim 1, wherein, of the two mobile phase portions bracketing the fluidic sample, one of the two mobile phase portions has the second solvent strength, and the other of the two mobile phase portions has a lower solvent strength compared to the first solvent strength of the fluidic sample.

7. The method according to claim 1, wherein the two mobile phase portions bracketing the fluidic sample each are arranged directly next to the fluidic sample and have the second solvent strength.

8. The method according to claim 1, wherein the third solvent strength of the further mobile phase is lower than the first solvent strength of the fluidic sample.

9. The method according to claim 1, comprising composing the further mobile phase to reduce a solvent strength profile between the fluidic sample and the at least one of the two mobile phase portions having the second solvent strength before the fluidic sample reaches the sample separation unit, by dilution with the further mobile phase having the third solvent strength.

10. The method according to claim 1, comprising composing the further mobile phase to selectively modify a dilution factor of the fluidic sample over time.

11. The method according to claim 1, wherein:
after the fluidic sample reaches the sample separation unit, at least part of the fluidic sample is adsorbed on the sample separation unit; and
the method comprises releasing the at least part of the fluidic sample adsorbed on the sample separation unit by driving an eluent through the sample separation unit, wherein the eluent is driven through only part of conduits flown through by the fluidic sample before the fluidic sample reaches the sample separation unit.

12. The method according to claim 1, comprising injecting the fluidic sample into the flow path towards the sample separation unit by combining, at a fluidic coupling point, the fluidic sample with one or both of the two mobile phase portions bracketing the fluidic sample.

13. The method according to claim 1, comprising, after separating the fluidic sample in the mobile phase into different fractions by the sample separation unit, transferring one or more of the different fractions to a further sample separation unit to separate the transferred one or more of the different fractions.

14. The method according to claim 1, comprising injecting the fluidic sample into the flow path towards the sample separation unit by combining, at a fluidic coupling point, the fluid packet sequence with the further mobile phase.

15. A method of separating a fluidic sample, the method comprising:
providing a sample separation device comprising a fluid drive and a sample separation unit downstream from the fluid drive along a flow path;
forming a fluid packet sequence comprising the fluidic sample bracketed between two mobile phase portions, and at least one additional mobile phase portion, wherein:
one of the two mobile phase portions follows the fluidic sample and the other of the two mobile phase portions leads the fluidic sample;
the fluidic sample has a first solvent strength; and
at least one of the two mobile phase portions has a second solvent strength higher than the first solvent strength;
the at least one additional mobile phase portion is arranged directly next to the fluidic sample, and is interposed between the fluidic sample and the one of the two mobile phase portions that follows the fluidic sample;
driving a further mobile phase having a third solvent strength by the fluid drive along the flow path toward the sample separation unit, wherein the second solvent strength is higher than the third solvent strength;
while driving the further mobile phase having the third solvent strength, injecting the fluid packet sequence into the flow path at a point between the fluid drive and the sample separation unit, wherein:
the further mobile phase having the third solvent strength comprises one further mobile phase portion following the one of the two mobile phase portions that follows the fluidic sample, and another further mobile phase portion leading the other of the two mobile phase portions that leads the fluidic sample;
the at least one additional mobile phase portion has a fourth solvent strength lower than the first solvent strength; and
the fluid packet sequence is driven with the another further mobile phase having the third solvent strength toward the sample separation unit; and
separating the fluidic sample into different fractions by the sample separation unit.

16. The method according to claim 15, wherein:
the at least one additional mobile phase portion directly next to the fluidic sample, and interposed between the fluidic sample and the one of the two mobile phase portions that follows the fluidic sample, is a first additional mobile phase portion; and
the at least one additional mobile phase portion comprises a second additional mobile phase portion arranged directly next to the fluidic sample, interposed between the fluidic sample and the one of the two mobile phase portions that leads the fluidic sample, and the second additional mobile phase portion has the fourth solvent strength.

17. The method according to claim 15, wherein the at least one of the two mobile phase portions having the second solvent strength is arranged directly next to the fluidic sample.

18. The method according to claim 15, wherein the two mobile phase portions bracketing the fluidic sample each have the second solvent strength.

\* \* \* \* \*